Figure 1:
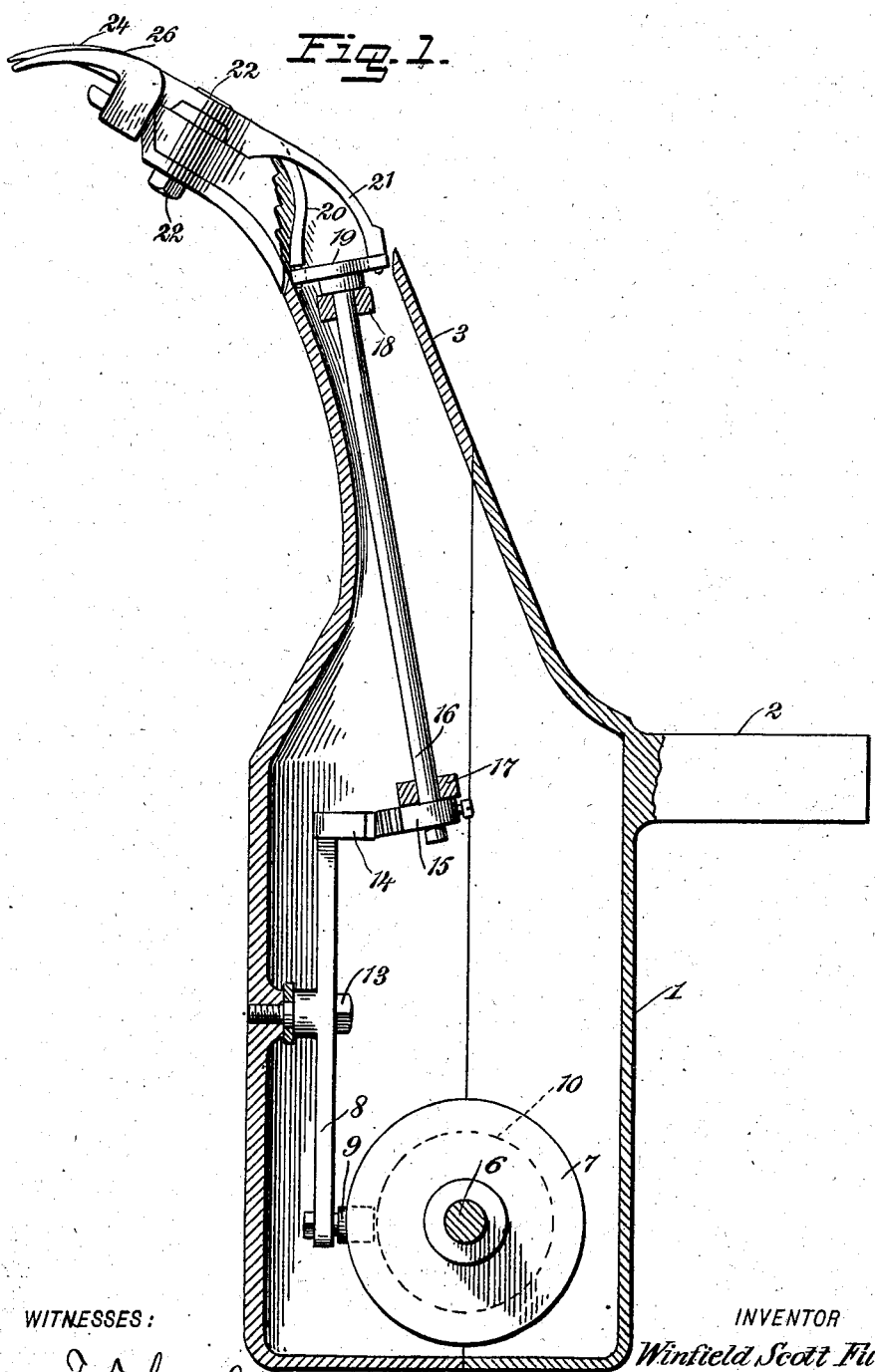

No. 721,509. PATENTED FEB. 24, 1903.
W. S. FULTZ.
MACHINE FOR CUTTING ARTICLES FROM THE INSIDES OF SHOES.
APPLICATION FILED FEB. 24, 1902.
NO MODEL. 2 SHEETS—SHEET 1.

WITNESSES:
James F. Duhamel
Walton Harrison

INVENTOR
Winfield Scott Fultz
BY Munn & Co.
ATTORNEYS

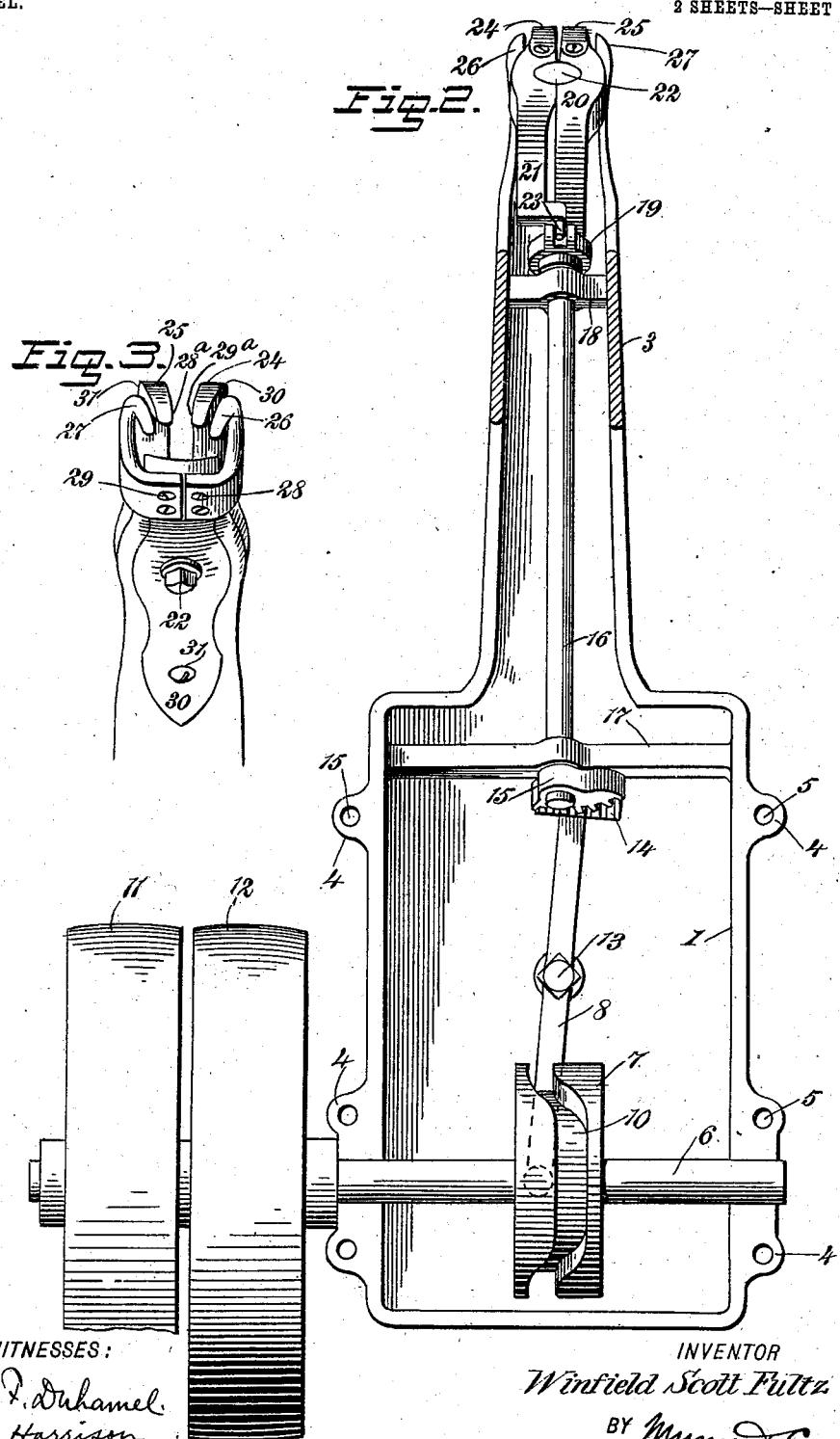

UNITED STATES PATENT OFFICE.

WINFIELD SCOTT FULTZ, OF NEW ORLEANS, LOUISIANA, ASSIGNOR OF ONE-HALF TO LENARD B. KEIFFER, OF NEW ORLEANS, LOUISIANA.

MACHINE FOR CUTTING ARTICLES FROM THE INSIDE OF SHOES.

SPECIFICATION forming part of Letters Patent No. 721,509, dated February 24, 1903.

Application filed February 24, 1902. Serial No. 95,278. (No model.)

*To all whom it may concern:*

Be it known that I, WINFIELD SCOTT FULTZ, a citizen of the United States, residing at New Orleans, in the parish of Orleans and State of Louisiana, have invented certain new and useful Improvements in Machines for Cutting Articles from the Inside of Shoes, of which the following is a full, clear, and exact description.

My invention relates to a machine for cutting nails, pegs, screws, and similar articles from the inside of shoes.

Reference is to be had to the accompanying drawings, forming part of this specification, in which similar characters of reference indicate corresponding parts in all the views.

Figure 1 is a vertical section of my device, showing certain details in elevation. Fig. 2 is a section at right angles to the view shown in Fig. 1, and Fig. 3 is a front elevation of the cutting-blades.

A bottle-shaped hollow casing 1 is mounted upon a bracket 2 for the purpose of supporting the movable parts. The casing is further provided with a hollow neck 3 for supporting the cutting mechanism and for protecting the gearing leading thereto. The casing is made, preferably, in halves, each half being provided with ears 4, having bolt-holes 5 for the purpose of securing the two halves together. A revoluble shaft 6 is mounted within the lower part of the casing and is provided with a wheel 7, having a cam-groove 10. A lever 8 is provided with a roller 9, which engages the cam-groove 10. Upon the shaft 6 are mounted the respective fixed and loose pulleys 11 12, which operate in the manner usual for such pulleys. The lever 8 is free to rock upon a pivot 13 and is provided at its upper end with a rack 14, which engages a somewhat similar rack 15, mounted upon the lower end of the rocking shaft 16. This rocking shaft is supported upon brackets 17 18 and is provided at its upper end with a head 19. A pair of crossed cutter members 20 21 are pivoted at 22 upon the extreme upper end of the neck 3 and are actuated by the rocking head 19. The respective lower ends of the rocking members 20 21 are provided with bosses 23 for the purpose of enabling said cutting members to be actuated by the rocking head 19. Blades 24 25, having cutting edges 28$^a$ 29$^a$ 30 31, are detachably secured upon the rocking members 20 21, and these blades constitute parts of the cutting mechanism, but are detachable from the other parts thereof. A pair of horn-shaped members 26 27 are rigidly secured, by means of the screws 28 29, upon the extreme outer end of the neck 3. These members 26 27 are provided with outer cutting edges immediately adjacent to the cutting edges 30 31 of the blades 24 25, so that when the blades 24 25 are caused to move laterally there are several cutting edges at work—that is to say, the members 24 25 in moving toward each other are free to cut an object inserted between them, whereas in moving apart from each other they may cut objects inserted between either of them and the members 26 27.

The operation of my device is as follows: A shoe having nails or pegs to be cut is turned bottom upward and slipped over the cutting mechanism. The workman now manipulates the shoe around over the neck, so that the cutters 24, 25, 26, and 27 come into contact with the nails or tacks, thus cutting the same out completely. By manipulating the shoe the workman is enabled to force the cutters into the remote parts of the toe thereof, so as to expose the least accessible parts of the shoe to the action of the cutter. It is not necessary for the workman to place his hand in the shoe while the cutters are at work. The neck 3 protects the gearing and also protects the shoe.

In operating this device there is little or no danger of an accident, and the work of cutting goes on within a few inches of the workman's face. The blades 24 25 can readily be removed for the purpose of sharpening or can be replaced by other blades when desired.

The machine is thrown into and out of action by a treadle connected with a stop motion. This part of the mechanism being old and common in shoe-working machinery, I do not regard an illustration and description of the same as essential to an understanding of my invention.

Having thus described my invention, I claim as new and desire to secure by Letters Patent—

1. A machine for cutting articles from the inside of shoes, comprising a frame having a neck for entering said shoes, said neck being provided with fixed cutting-blades and with cutting-blades loosely mounted adjacent to said fixed cutting-blades and movable relatively thereto, and mechanism for actuating said movable cutting-blades.

2. A machine for cutting articles from the inside of shoes, comprising a frame provided with a member for entering said shoes, a plurality of blades fixed upon said member, a plurality of two-edged blades loosely mounted upon said member and free to approach and recede from each other, and driving mechanism for actuating said movable blades.

3. A machine for cutting articles from the inside of shoes, comprising a frame provided with a member for entering said shoes, a plurality of two-edged blades pivoted upon said member and free to move, and a pair of blades fixed upon said member and disposed upon opposite sides of said two-edged blades and provided with edges mating divers edges of said two-edged blades, and means for actuating said two-edged blades.

4. A machine for cutting articles from the inside of shoes, comprising a frame provided with an open-ended hollow member for entering shoes, a plurality of blades provided with cutting edges and loosely pivoted upon said member, a plurality of blades fixed upon said hollow member and provided with cutting edges mating divers cutting edges of said two-edged blades, cam mechanism for actuating said two-edged blades, and gearing for connecting said cam mechanism with said two-edged blades, said gearing being shielded by said hollow member.

5. A machine for cutting articles from the inside of shoes, comprising a frame provided with an open-ended hollow member for entering shoes, a plurality of movable blades each provided with two edges, said edges being normally free to shear past each other to a limited extent, a pair of fixed blades rigidly connected with said hollow member and disposed upon opposite sides of said first-mentioned blades, said fixed blades being provided with cutting edges disposed oppositely to the cutting edges of said movable blades, and mechanism for actuating said movable blades.

In testimony whereof I have signed my name to this specification in the presence of two subscribing witnesses.

WINFIELD SCOTT FULTZ.

Witnesses:
FELIX J. DREYFOUS,
FRANK WATKINS SHERMAN.